June 28, 1927.

W. C. STARR 1,634,048

FLEXIBLE TREAD WHEEL

Filed April 21, 1926

W. C. Starr Inventor

By C.A.Snow & Co.
Attorneys.

June 28, 1927.

W. C. STARR

FLEXIBLE TREAD WHEEL

Filed April 21, 1926   2 Sheets-Sheet 2

1,634,048

W. C. Starr Inventor

By C A Snow & Co.
Attorneys.

Patented June 28, 1927.

1,634,048

UNITED STATES PATENT OFFICE.

WYATT C. STARR, OF LAKE WALES, FLORIDA.

FLEXIBLE-TREAD WHEEL.

Application filed April 21, 1926. Serial No. 103,571.

This invention aims to provide a novel tread for a vehicle wheel, and to provide novel means for connecting the tread to the wheel.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

The numeral 1 marks a wheel having a circumferentially grooved rim 2.

Figure 1:
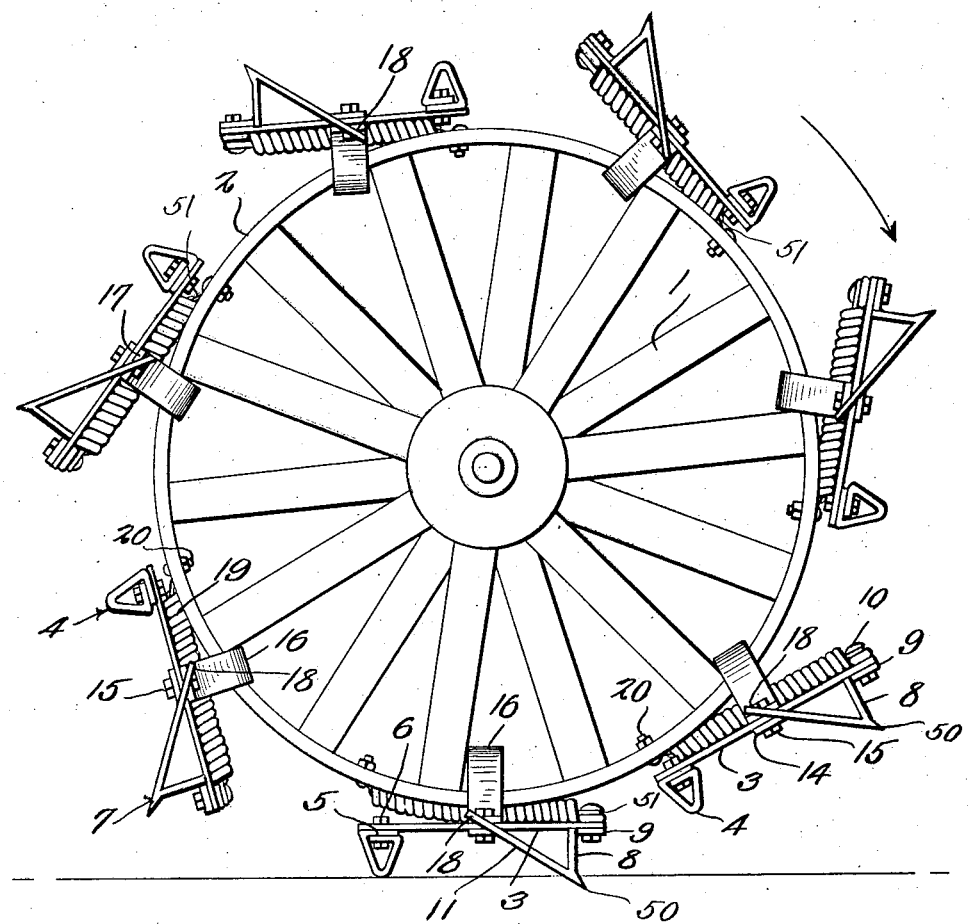
Figure 1 shows in side elevation, a wheel constructed in accordance with the invention.
Figure 2:
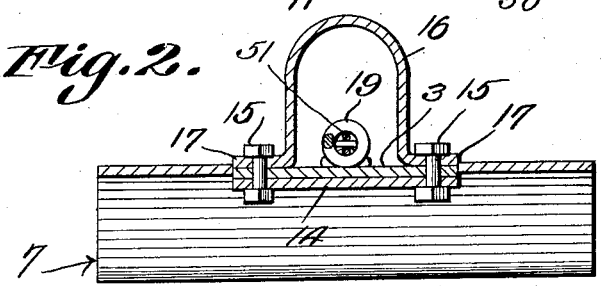
Figure 2 is a transverse section taken through the tread member.
Figure 3:
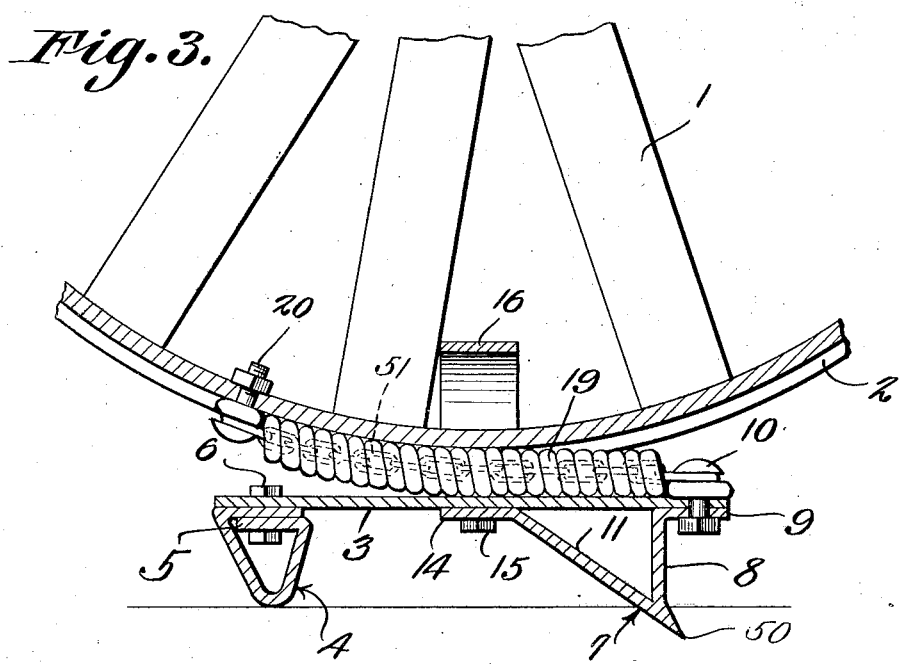
Figure 3 is a longitudinal section on an enlarged scale as compared with Figure 1, some parts appearing in elevation.
Figure 4:
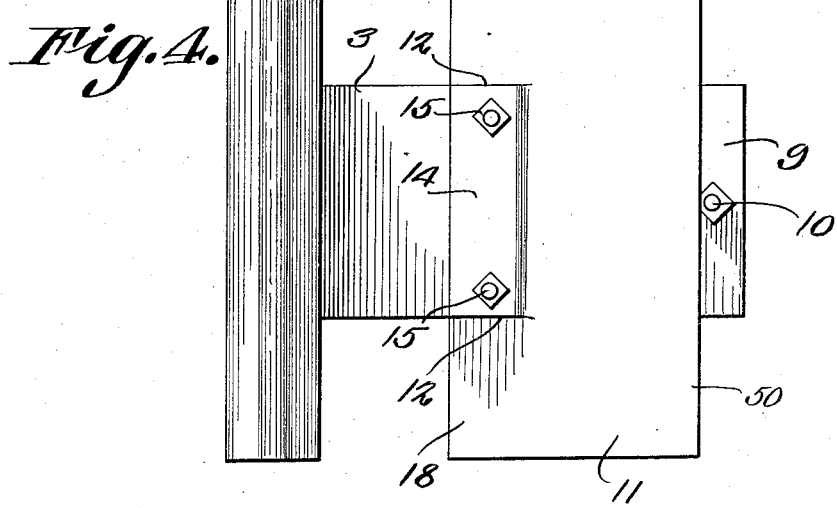
Figure 4 is an outer plan of the tread member.

A plurality of tread members is provided. Each tread member includes a base plate 3. Across the base plate 3 extends a traction cleat 4. The traction cleat 4 is V-shaped in cross section, as shown in Figure 3. It includes overlapped flanges 5 connected by securing elements 6 to one end of the base plate 3. The length of the traction cleat 4 is considerably greater than the width of the base plate 3. Figure 4 shows this. The tread member includes a second traction cleat 7. The traction cleat 7 is of considerably greater length than the width of the base plate 3 and may be of about the same length as the traction cleat 4. The traction cleat 7 includes a wall 8 disposed about at right angles to the base plate 3 and provided with a lip 9 of the same width as the base plate 3. A securing element 10 connects the lip 9 with one end of the base plate 3. The cleat 7 embodies a wall 11 connected to the outer end of the wall 8 and disposed at an acute angle to the wall 8 and to the base plate 3. Where the parts 8 and 11 join there is a projecting toe or flange 50 which increases the hold of the tread member on the ground, the wheel turning in the direction of the arrow A in Figure 1. In the edge of the wall 11, slits 12 are formed. The slits 12 make a flange 14 which is held by securing elements 15 on the base plate 3. Securing elements 15 retain a U-shaped yoke 16 on the base plate 3, the yoke 16 having side arms 17 through which the securing elements 15 pass. The slits 12 in the wall 11 of the cleat 7 form two fingers 18 which are left in the same plane with the wall 11. The fingers 18 extend inwardly at an angle along the edges of the base plate 3 and along the edges of the arms 17 of the yoke, this construction strengthening the cleat 7, so that all of the strain does not come on the securing elements 15. The yoke 16 extends around the rim 2 of the wheel 1. The securing element 10 holds one end of a resilient member 19, said member 19 preferably being in the form of a spring, the convolutions of which are in contact, so that the said spring cannot be compressed. The spring 19 is adapted to ride in the grooved rim 2 of the wheel 1, one end of the spring 19 being connected at 20 to the wheel rim 2. The yoke 16, cooperating with the rim 2, prevents the tread member from having an undesirable amount of lateral play with respect to the wheel rim, the spring 19 forming a yieldable connection between the tread member and the wheel, the cleats 4 and 7 acquiring a hold on the ground, and the wheel operating in a way which will be understood readily when Figures 1 and 3 are compared. A flexible member, such as a chain 51, extends through the spring 19 and is secured at its ends to the bolts 10 and 20. The chain 51 does not interfere with the transverse flexibility of the spring 19, but it takes practically all of the pulling strain off the spring, and still allows the spring 19 to yield sidewise so that there may be sidewise movement of the tread member with respect to the wheel when the wheel makes a turn sidewise, for instance when the vehicle is being steered. The tread member remains fixed on the ground, and the wheel shifts sidewise on the tread member but does not wrench the tread member in the ground. The inclined part 11 of the tread member presses the soft earth both ahead and down, and this operation aids greatly in preventing the wheel from slipping or digging in.

What is claimed is:—

1. In a device of the class described, a wheel including a rim having a circumferential groove, a tread member comprising a yoke, and a resilient connector disposed outside of the rim and extended longitudinally of the rim and so shaped in cross section as to fit in the groove of the rim, one end of the connector being attached to the tread member, and the other end of the connector being attached to the rim.

2. In a device of the class described, a wheel including a rim, a tread member including a yoke extending transversely about the rim, and a spring disposed outside of the rim and extending longitudinally of the rim, the spring comprising convolutions which are in contact, one end of the spring being connected to one end of the tread member, and the other end of the spring being connected to the rim at a point adjacent to the opposite end of the tread member.

3. In a device of the class described, a wheel including a rim, a tread member having a yoke extending about the rim, and a resilient member disposed outside of the rim and extended longitudinally of the rim, the resilient member being connected at its ends to the tread member and to the rim.

In testimony that I claim the foregoing as my own, I have hereto affixed my signature.

WYATT C. STARR.